United States Patent [19]

Rohrbacher

[11] Patent Number: 4,599,780
[45] Date of Patent: Jul. 15, 1986

[54] APPARATUS AND METHOD OF ADDING A PASSENGER COMPARTMENT TO A MINI-TRUCK OR A SIMILAR STRUCTURE

[76] Inventor: William H. Rohrbacher, 701 S. State St., Hemet, Calif. 92343

[21] Appl. No.: 524,939

[22] Filed: Aug. 22, 1983

[51] Int. Cl.$^4$ ............... B21K 21/16; B23P 17/04; B62D 21/00; B60J 9/00
[52] U.S. Cl. ................ 29/401.1; 29/150; 280/781; 296/183; 296/193
[58] Field of Search ............ 29/150, 155 R, 401.1; 280/781; 296/183, 193, 197

[56] References Cited

U.S. PATENT DOCUMENTS

| | | | |
|---|---|---|---|
| 2,246,247 | 6/1941 | Godshalk | 29/150 |
| 3,499,258 | 3/1970 | Durand | 29/155 R X |
| 4,231,144 | 11/1980 | Bernacchia | 29/401.1 |
| 4,342,146 | 8/1982 | Hanson | 29/401.1 |

*Primary Examiner*—Howard N. Goldberg
*Assistant Examiner*—Irene Golabi
*Attorney, Agent, or Firm*—Arthur L. Plevy

[57] ABSTRACT

A method for adding a compartment to a commercially available mini-truck vehicle includes the steps of cutting the frame rails of the original vehicle to separate the front and cargo sections and then extending the chassis by adding extension members which are welded to the cut rails. A frame platform is emplaced on the extended sections and a fiberglass compartment is secured to the frame platform. The resultant vehicle possesses the same contours as the original vehicle while the added compartment allows at least two additional passengers to be transported.

19 Claims, 11 Drawing Figures

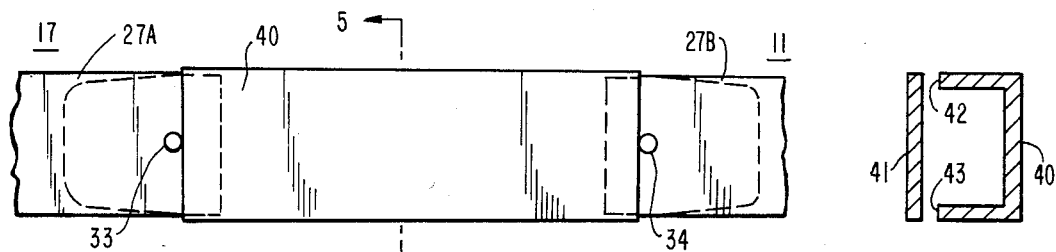
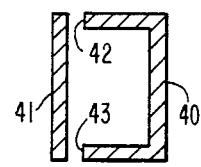
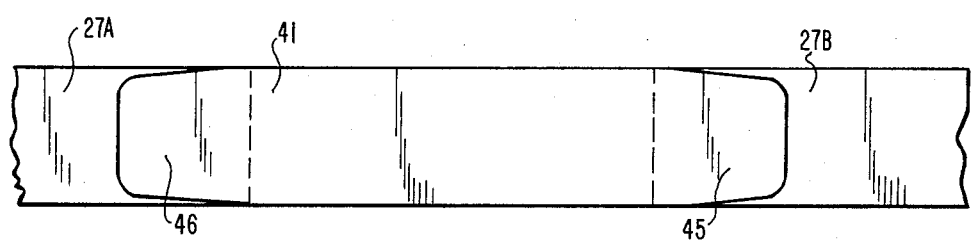
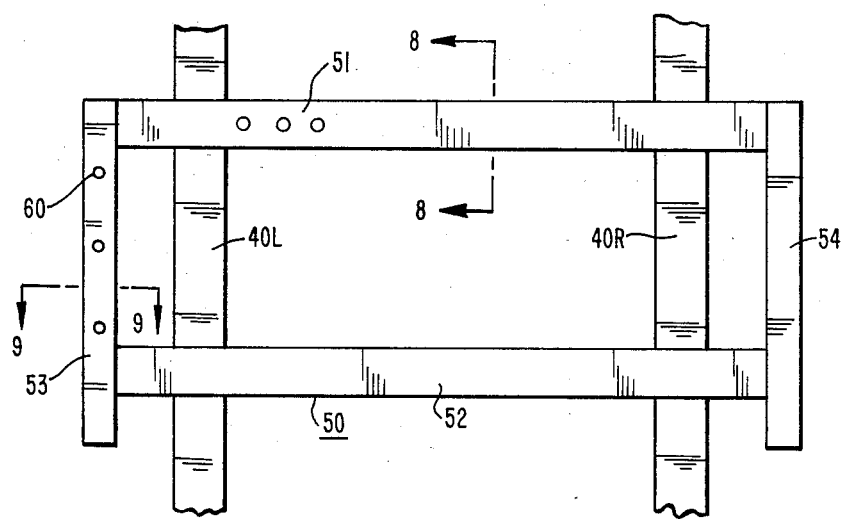
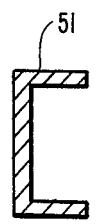
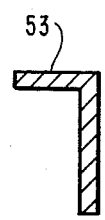

APPARATUS AND METHOD OF ADDING A PASSENGER COMPARTMENT TO A MINI-TRUCK OR A SIMILAR STRUCTURE

BACKGROUND OF THE INVENTION

The present invention relates to a mini-truck vehicle and to a method of adding a passenger compartment to a standard commercial mini-truck to effectively increase the passenger carrying capacity.

The mini-truck has achieved wide spread popularity as they are efficient vehicles and enable the user to haul light cargo. A major disadvantage of such vehicles is that they possess limited passenger carrying capability. In addition to the limited seating capacity a somewhat rougher ride is offered by the vehicle when no cargo is being transported.

As will be further explained the method to be described herein involves cutting the vehicle and adding a full size fiberglass cab extension. The added cab extension is large enough to accomodate a full size bench seat. The addition of the cab section increases the overall length of the vehicle and hence the wheel base which enables the vehicle to offer a smoother ride.

The concept of adding additional passenger capacity to commercial vehicles is not new. The prior art was cognizant of such problems and many patents exist which employ various methods and techniques to accomplish such results.

For example, U.S. Pat. No. 4,231,144 entitled METHOD OF CONVERTING A VAN-TYPE VEHICLE TO A MULTI-PASSENGER COMMERCIAL TRANSPORTATION VEHICLE issued on Nov. 4, 1980 to George Bernachia, Jr.

This patent describes a method of cutting a van-type vehicle chassis and attaching a chassis extension support between the severed sections. The methods involves the altering of the roof and attaching an enlarged roof section while further attaching fixed sidewall members. As one can ascertain, the method is relatively complex and laborious.

Other patents such as U.S. Pat. No. 3,652,121 entitled PICK-UP TRUCK BOX MOUNTED CAB issued on Mar. 28, 1972 to E. V. Hjelm depicted an enclosure for mounting in the forward end of the load bed of a pickup truck. The enclosure is secured within the load bed and secured to the vehicle. The problem is that the enclosure reduces the load carrying capacity of the vehicle by one-half. The enclosure also changes the center of the gravity in a way to render the vehicle more difficult to drive and manuever.

Other patents as U.S. Pat. Nos. 4,014,585 and 4,221,426 show alternate techniques for increasing the passager carrying capabilities of various types of vehicles.

In any event most of the methods employed are difficult to implement and require extensive tooling and construction steps in order to accomplish the end results. The additions in many cases sacrifice safety and reliability of the vehicle and have not achieved great acceptance by the public.

It is any object of the present invention to provide a method for increasing the passenger carrying capability of a mini-truck, by means of an efficient and reliable method while providing a resultant vehicle which is safe and reliable in operation and use.

BRIEF DESCRIPTION OF THE PREFERRED EMBODIMENT

A method of adding a passenger section to a mini-truck vehicle, said vehicle of the type having a front section containing front wheels and a drivers compartment and contiguous with a rear cargo section having rear wheels and a cargo containing area, said front and rear sections coupled together via at least two longitudinally extending frame rails, comprising the steps of placing the vehicle on a raised platform, removing the cargo area to expose said frame rails, forming two reference points on said frame rails, cutting said frame rails between said reference points, extending said cut rails by attaching an extension member between said cut portions and located in alignment with said reference points, welding said extension member to said cut frame rails, securing a frame platform between said extended rails, placing a passenger section upon said frame member.

BRIEF DESCRIPTION OF THE FIGURES

FIG. 4 is a side view of an extension channel positioned between the cut sections of a frame rail.

FIG. 5 is a sectional view taken through line 5—5 of FIG. 4.

FIG. 6 is the opposite side view of FIG. 4 showing the cover plate welded to the extension channels and frame rails.

FIG. 7 is a top plan view of a support frame secured to the frame rails.

FIG. 8 is a sectional view taken through line 8—8 of FIG. 7.

FIG. 9 is a sectional view taken through line 9—9 of FIG. 7.

DETAILED DESCRIPTION OF THE FIGURES

Figure 1:
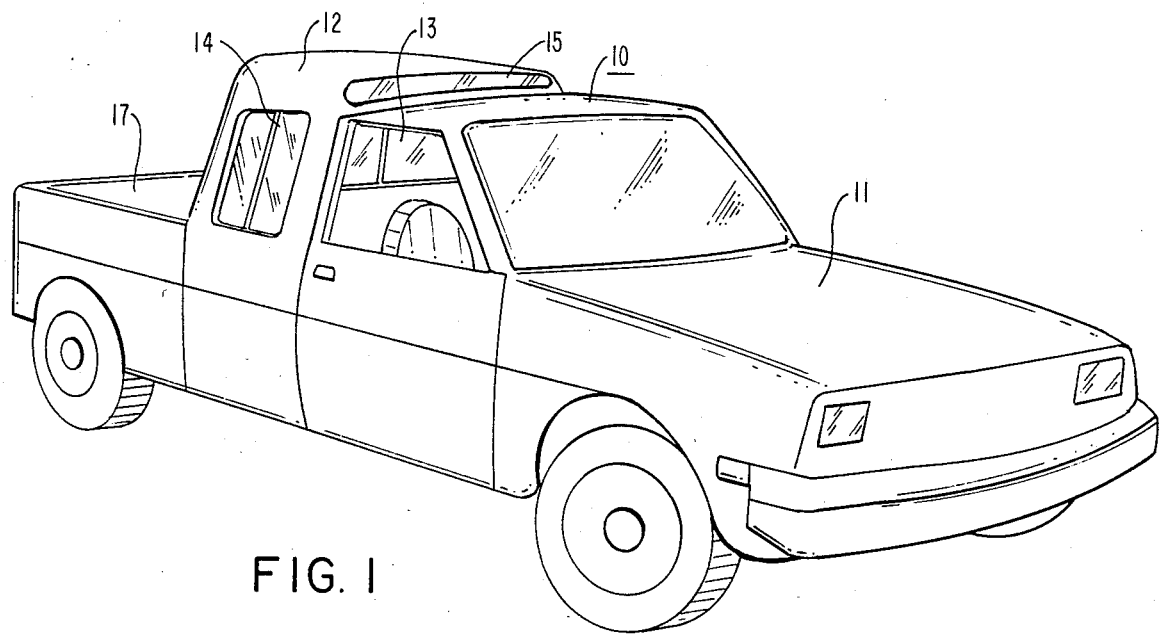
FIG. 1 is a perspective view of a vehicle including the added passenger compartment according to this invention.

Referring to FIG. 1, there is shown a modified mini-truck vehicle 10 according to this invention. The vehicle includes the front portion 11 containing the engine, front wheels and standard driver and passenger compartment. The added section is a fiber glass cab extension large enough to accomodate a full size bench set. In typical cases the extension is between 30–35 inches in length and increases the length of a vehicle by this amount. The extension 12 includes a side window 14. There is another window on the other side which is of the same shape and size. The compartment 12 also has a top elongated window 15 with a rear window 16. The cargo section 17 of the truck remains unaltered in size and structure.

Essentially, as will be explained, the cab section 12 is so conformed and shaped as to preserve the original lines of the vehicle, which before modification consists of sections 11 and 17. The method and concept to be described is applicable to a wide variety of commercially available mini-trucks, as for example, the Dodge D-50, the Ford Ranger, the Chevy S-10 and so on.

The standard commercially available mini-truck with bucket seats is a two passenger vehicle, a standard truck with bench seats is a two passenger vehicle when it has two seat belts and is a three passenger vehicle when it has three seat belts. In the vehicle shown in FIG. 1, the front seats are always two passenger and the back seat (cab-section 12) can serve as an additional two passenger unit for two seat belts and a three passenger unit for three seat belts.

Figure 2:
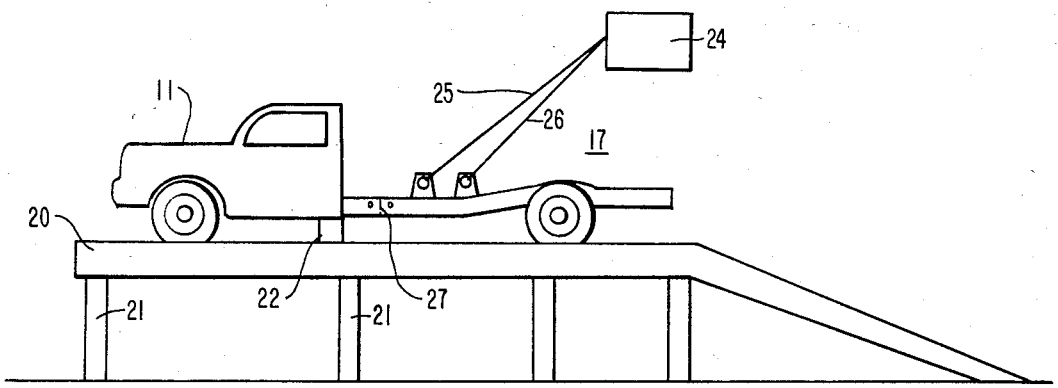
FIG. 2 is a side plan view of a vehicle emplaced on a raised support platform prior to adding the compartment.

The standard truck is driven up onto an elevated ramp structure for bed removal and component disassembly. The bed section 17 is removed from the vehicle exposing the frame. This is shown in FIG. 2.

In FIG. 1 the elevated ramp structure consists of two top rails 20 which are channel members to accomodate the wheels of the vehicle. The top rails 20 are supported by vertical posts 21 which extend from the floor upwardly. This construction of the ramp enables a worker to have complete access to the vehicle during the conversion method. The worker then positions a support bar 22 to stabilize the front section 11 of the vehicle after it is cut. The front part of the bed section 17 is held by a tower unit 24 whereby cables as 25 and 26 are secured to the floor of the bed section 17 to hold the same when the chassis is cut. On some trucks this front bed mounted is removed and on others it is not. In all cases the section of the frame rails 27 immediately behind the original cab is where the chassis is cut. Before cutting the frame rails 27 two reference points are located on the frame prior to the cutting the frame in two.

Figure 3:
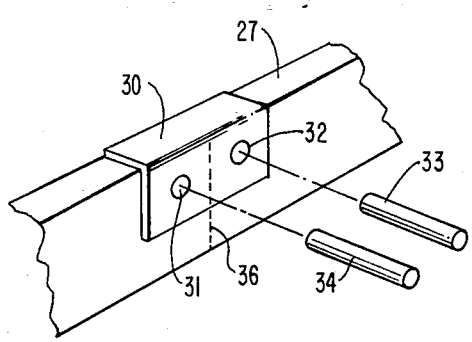
FIG. 3 is a partial view of a jig fixture emplaced on a frame rail to be cut.

A reference jig 30 (shown in FIG. 3) is placed over each rail 27 and holes are drilled in the rails using the apertures 31 and 32 of the jig as reference guides. The holes are $\frac{1}{4}$" diameter holes in which two hardened machine dowel pins 33 and 34 are inserted.

The jig 30 is removed from the rail 27 and a chalk mark 36 is made between the dowel pins 33 and 34. This mark 36 is where the chassis will be cut in two. The frame rails 27 are then cut at each side along the chalk marks 36 and the frame is separated into two sections.

Two C shaped channels 40, one for each side are emplaced over the severed frame rails and are abutted against the dowel pins 33 and 34 with their edges contacting the dowel pins.

The C channels 40 are the same size and by causing the edges to butt up against the dowel pins 33 and 34 one is assured that both frame rails 27 (right and left sides) have been extended by the same amount.

Once the channels 40 are in position and abutting against the reference dowel pins 33 and 34, the worker now measures to align the channels by measuring from the bottom plane of the channels 40 to the bottom plane of the original frame. The channels 40 are then tacked to the severed frame rails 27A and 27B.

The C or U channels 40 are then welded to the frame rail sections 27A and 27B, and then a cover plate 41 (FIG. 5) is then welded to the peripheral edges 42 and 43 of the channel 40 to completely enclose the same. The cover plate 41 has a overlap on the end of the plate where it is further welded to the frame rail sections 27A and 27B (FIG. 6). As seen in FIG. 6 the weld of the cover plate is about the edges of the channel 40 and the cover plate has extending ends 45 and 46 which are welded to the frame rail sections 27A and 27B. In this manner the stress points between the channel members 40 and the frame rail sections 27A and 27B are broken up and evenly distributed to gain greater mechanical strength.

The welding may be accomodated by using a stitch pattern instead of a continuous weld. The stitch pattern allows flexing to occur which prevents the breaking of the weld during vehicle operation.

At this point the various components which were disassembled prior to cutting the chassis are then emplaced in their Thus the tubing for the brakes, wiring, fuel system piping as fuel line from the tank to the engine and so on are lengthened and are connected to again connect the front section 11 to the bed section 17.

Referring to FIG. 7, a steel frame 50 is welded to the extended frame rails and are welded on the surface of the channel members 40. The frame consists of top and bottom U shaped channels 51 and 52, which are welded to the back edges of angled "L" channels 53 and 54. It is of course understood that various other cross-sectional channel members could be employed.

A floor is placed over the frame 50 which is a $\frac{3}{4}$" CDX exterior plywood mounted on the steel frame 50. The otherside of the plywood floor has secured thereto a metal pan made from a stucco embossed aluminum. The pan is secured to the frame 50 and the plywood and creates a metal vapor barrier.

The floor is secured to the frame by means of the apertures 60 drilled in the frame 50. The entire back of the front section 11 is now removed to create a large opening for access to the cab section 12 which is to be mounted on the wooden floor covering the frame 50.

Figure 10:
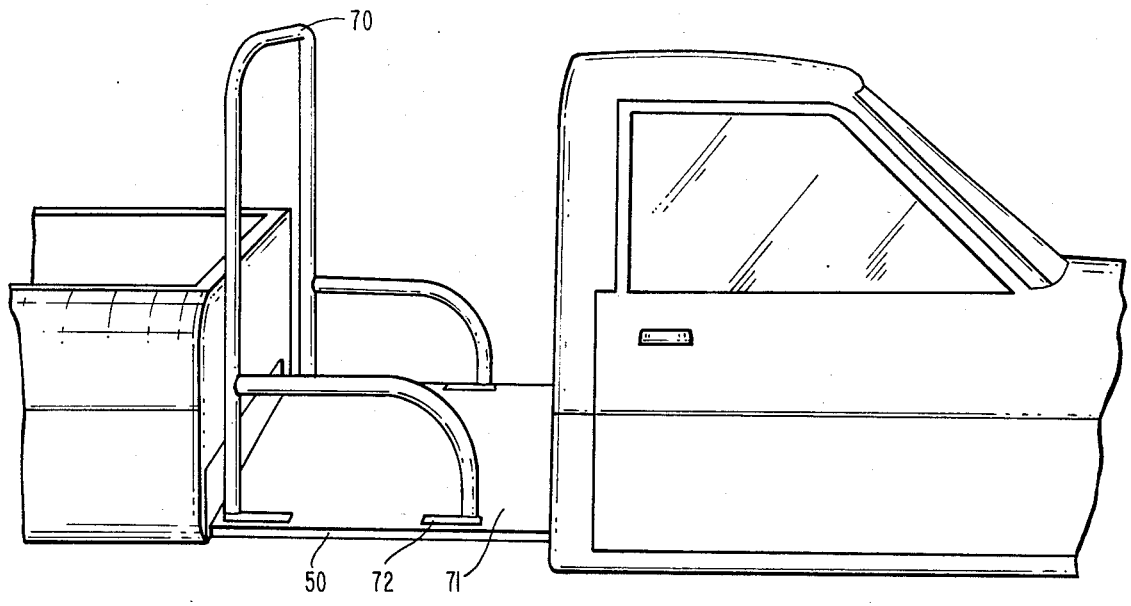
FIG. 10 is a perspective view showing a floor and roll bar assembly mounted to the frame member of FIG. 9.
Figure 11:
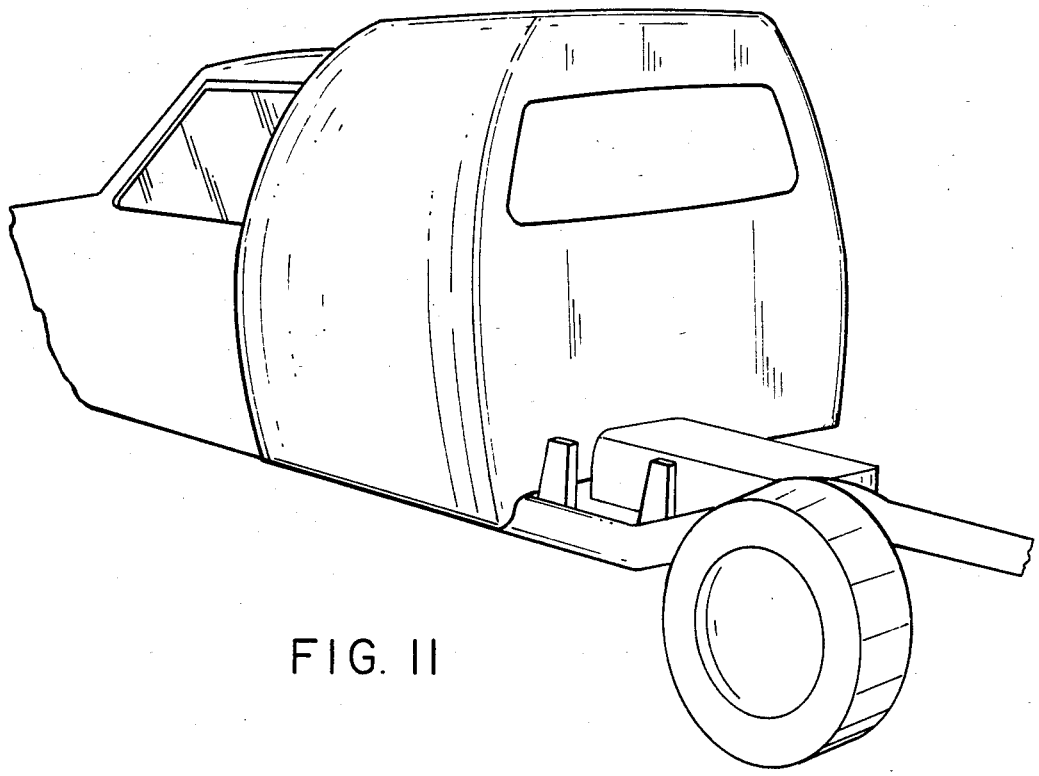
FIG. 11 is a perspective view showing the added cab section emplaced on the vehicle.

Referring to FIG. 10 there is shown a tubular roll bar assembly 70 fastened to the wooden platform 71 which is secured to the frame 50. The roll bar assembly 70 is manufactured and supplied by Smitty-bilt Mfg. of El Monte, Calif. The material is 2 inch diameter×0.120 C1010 mechanical tubing. The mounting pads 72 are $\frac{1}{4}$" plate. Each pad is mounted with two $\frac{3}{8}$" diameter grade 5 bolts through the plywood floor 71 and through the 2×2×$\frac{1}{4}$" structural steel angles as angles 53 and 54 that constitute the outside of the floor frame 50.

The rear of the front section 11 of the original vehicle is now entirely removed but a peripheral flange is left. In removing the rear wall of the front section one leaves the entire structure apart from the rear wall intact. The flange is about two inches and is used to secure the fiber glass hull to the front section. By removing the rear wall there is no flexing or distortion to the front section and therefore the hoop strength of the section is unaffected. There are some manufacturers who cut out the roof section between the supporting posts for more head room and that literally distroys the hoop strength of the front section and is dangerous.

The fiberglass cab is now positioned over the roll bar and secured to the vehicle floor by wood screws every one inch. The cab is a fiber glass hull fabricated by conventional techniques and is secured to the wooden floor. The fiber glass hull is then cut to allow the installation of the windows and so on. The periphery of the cab section 12 is secured to the front section 11 by means of steel pop rivets every 4 inches around the periphery of the cab. The joining area between the cab section 12 and the front section is covered with a trim which is pop riveted through the fiber glass cab and the front section using steel rivets.

It is of course understood that the fabrication of a fiber glass hull or cab section 12 is well known in the art and this is not considered part of the invention. It is the procedures used on the vehicle including those employed to stretch the vehicle to allow the additional section be emplaced thereon that constitutes the important aspects of this invention.

The fiber glass hull or cab section 12 has an internal hollow which is then further treated as the plywood floor is fiberglassed to the hull and the sides of the hull are treated with a silicone elastomeric compound to completely seal the same to the truck sections and the interior is fitted with a bench for passenger seating. The inside may be carpeted and further finished to match the interior of the original vehicle.

I claim:

1. A method of adding a passenger section to a minitruck vehicle, said vehicle of the type having a front section containing front wheels and a drivers compartment and contiguous with a rear cargo section having rear wheels and a cargo containing area, said front and rear sections coupled together via at least two longitudinally extending frame rails, comprising the steps of:
   (a) removing the cargo containing area to expose said frame rails,
   (b) forming two spaced apart reference points on each of said frame rails by placing a jig over each of said frame rails, said jig having at least two spaced apart apertures, drilling holes in said frame rails in accordance with the location of said apertures on said jig, and inserting dowel pins in said apertures as drilled in said frame rails and marking said frame rails between said drilled apertures to provide a guide line for cutting said respective rails,
   (c) cutting said frame rails between said reference points and along said guide line to provide cut portions,
   (d) extending said cut rails by mounting an extension member between comprising a U-shaped channel between and over each said cut portions and by aligning speed apart edges of said extension member abutting against said dowel pins,
   (e) welding said extension member to said cut frame rails to form extended rails,
   (f) securing a support member between said extending rails, and
   (g) placing a passenger section upon said support member.

2. The method according to claim 1 further comprising welding a cover plate over the open end of said U shaped channel with said plate having ends which overlap onto said cut frame rail sections, and further welding said ends to said frame rails and said plate to said channels.

3. The method according to claim 1 wherein the step of securing a frame platform between said extended rails comprises welding a steel picture frame structure between said rails.

4. The method according to claim 3 further including the step of placing a planar support floor on said frame prior to placing said passenger section upon said frame member.

5. The method according to claim 1 further comprising the steps of:
   (a) supporting said front section of said vehicle prior to cutting said frame rails,
   (b) supporting said cargo section of said vehicle prior to cutting said frame rails.

6. The method according to claim 5 wherein said supporting of said cargo area comprises emplacing supporting cables on said area and attaching said cables to a tower apparatus.

7. The method according to claim 1 wherein said passenger section is a fiber glass hull.

8. The method according to claim 1 wherein said cutting said frame rails is implemented closer to said front section of said vehicle.

9. The method according to claim 1 wherein said step of welding is implemented by a stitch welding pattern.

10. The method according to claim 1 including the step of securing a roll bar structure to said frame platform prior to placing said passenger section upon said frame member.

11. A method of adding a passenger section to a vehicle, said vehicle of the type having a front section containing front wheels and a driver's compartment and contiguous with a rear section having rear wheels, and front and rear sections coupled together via at least two longitudinally extending frame rails, comprising the steps of:
   (a) removing at least a portion of said rear section to exposed said frame rails,
   (b) inserting a pair of spaced dowel pins through each frame rail, with the space between each pair of dowel pins being equal,
   (c) cutting each frame rail between its corresponding dowel pins,
   (d) placing an extension member between the cut portions of each frame rail and located in abutment with its corresponding dowel pins,
   (e) welding each extension member to its corresponding cut frame rails to extend each frame rail, and
   (f) placing an additional rear section upon said extended frame rails.

12. The method according to claim 11 further comprising the step of placing said vehicle on a raised platform before said step of removing.

13. The method according to claim 11 further comprising the step of securing a frame platform over said extended frame rails, said passenger section being placed on said frame platform.

14. A method of adding to section to a vehicle, said vehicle of the type having a front section containing front wheels and a drivers compartment and contiguous with a rear cargo section having rear wheels and a cargo containing area, said front and rear sections coupled together via at least two longitudinally extending frame rails, comprising the steps of:
   (a) removing the cargo containing area to expose said frame rails,
   (b) forming two spaced apart reference points on each of said frame rails by placing a jig over each of said frame rails, said jig having at least two spaced apart apertures, drilling holes in said frame rails in accordance with the location of said apertures on said jig, and inserting dowel pins in said apertures as drilled in said frame rails and marking said frame rails between said drilled apertures to provide a guide line for cutting respective rails,
   (c) cutting said frame rails between said reference points and along said guide line to provide cut portions,
   (d) extending said cut rails by mounting an extension member between said cut portions and by aligning spaced apart edge portions of said extension member abutting against said dowel pins,
   (e) securing said extension member to said cut frame rails to form extended rails, and (f) securing a support member between said extending rails for supporting an added section thereon between said front and rear section.

15. The method of claim 14 wherein the distance between said spaced apart reference points on each of said frame rails is substantially identical.

16. The method of claim 14 wherein said aligning comprises arranging the ends of said extension member coincident with said reference points.

17. The method of claim 14 wherein said reference points are spaced inwardly of the ends of said cut portions.

18. An extended frame assembly for a vehicle comprising at least two longitudinally extending frame rails, each frame rail consisting of two rail sections formed by cutting a single frame rail, a pair of spaced dowel pins respectively extending through the rail sections of each frame rail, said dowel pins being spaced apart an equal distance on their respective frame rails before cutting, and an extension member extending over a portion of each rail section with its respective ends in abutment with said dowel pins, the lengths of the extension members being equal so that the lengths of the extended frame rails thus formed are equal.

19. The frame assembly of claim 18 wherein said extension member is welded to said portions of its respective rail sections.

* * * * *